United States Patent
Satoh

(10) Patent No.: US 10,419,278 B2
(45) Date of Patent: Sep. 17, 2019

(54) DEVICE MANAGEMENT SYSTEM, INFORMATION PROCESSING APPARATUS, AND INFORMATION PROCESSING METHOD

(71) Applicant: Jun Satoh, Tokyo (JP)

(72) Inventor: Jun Satoh, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 238 days.

(21) Appl. No.: 15/272,599

(22) Filed: Sep. 22, 2016

(65) Prior Publication Data

US 2017/0099178 A1    Apr. 6, 2017

(30) Foreign Application Priority Data

Oct. 2, 2015   (JP) .................. 2015-197110
Aug. 29, 2016   (JP) .................. 2016-167168

(51) Int. Cl.
*H04L 12/24* (2006.01)
*H04L 12/26* (2006.01)
*H04L 29/08* (2006.01)

(52) U.S. Cl.
CPC ........ *H04L 41/069* (2013.01); *H04L 41/0672* (2013.01); *H04L 41/0686* (2013.01); *H04L 43/0805* (2013.01); *H04L 67/10* (2013.01)

(58) Field of Classification Search
CPC ............... H04L 41/069; H04L 41/0672; H04L 41/0686; H04L 43/0805; G06F 15/16
USPC .................... 709/224, 229; 714/30
See application file for complete search history.

(56) References Cited

U.S. PATENT DOCUMENTS

| 6,161,201 | A | * | 12/2000 | Payne | .................. H04M 11/062 340/853.2 |
| 7,234,023 | B2 | * | 6/2007 | Abe | ...................... G06F 3/0614 711/112 |
| 8,738,925 | B1 | * | 5/2014 | Park | ........................ H04B 7/26 713/186 |

(Continued)

FOREIGN PATENT DOCUMENTS

| JP | 2012-037944 | 2/2012 |
| JP | 2016-085621 | 5/2016 |

*Primary Examiner* — Tesfay Yohannes
(74) *Attorney, Agent, or Firm* — Harness, Dickey & Pierce, P.L.C.

(57) ABSTRACT

A device management system includes an information processing apparatus residing on a first network, a function providing apparatus residing on a second network and configured to provide a function to the information processing apparatus through a third network, and a log transfer apparatus residing on the first network and configured to communicate data with a providing-side device residing on the second network through a communication channel between the log transfer apparatus and the providing-side device. The information processing apparatus includes first circuitry to, in response to detecting a status in which the information processing apparatus is not able to communicate data with the function providing apparatus through the third network, generate an error log, and transmit the error log to the log transfer apparatus. The function providing apparatus includes second circuitry to acquire from the providing-side device the error log, and detect the state of the information processing apparatus.

11 Claims, 9 Drawing Sheets

(56) References Cited

U.S. PATENT DOCUMENTS

| | | | |
|---|---|---|---|
| 2008/0188216 A1* | 8/2008 | Kuo | H04W 24/08 455/424 |
| 2009/0287837 A1* | 11/2009 | Felsher | G06F 19/328 709/229 |
| 2010/0317420 A1* | 12/2010 | Hoffberg | G06Q 30/0207 463/1 |
| 2011/0170667 A1* | 7/2011 | Ruggiero | A61B 6/461 378/98.5 |
| 2011/0320726 A1* | 12/2011 | Noda | G06F 3/061 711/130 |
| 2013/0159021 A1* | 6/2013 | Felsher | G06F 19/328 705/3 |
| 2014/0032965 A1* | 1/2014 | Tsukamoto | G06F 11/3024 714/30 |
| 2014/0067445 A1* | 3/2014 | Ishikawa | G06Q 10/063 705/7.11 |

* cited by examiner

DEVICE MANAGEMENT SYSTEM, INFORMATION PROCESSING APPARATUS, AND INFORMATION PROCESSING METHOD

CROSS-REFERENCE TO RELATED APPLICATIONS

This patent application is based on and claims priority pursuant to 35 U.S.C. § 119(a) to Japanese Patent Application Nos. 2015-197110, filed on Oct. 2, 2015, and 2016-167168, filed on Aug. 29, 2016 in the Japan Patent Office, the entire disclosures of which are hereby incorporated by reference herein.

BACKGROUND

Technical Field

The present disclosure relates to a device management system, an information processing apparatus, and an information processing method.

Description of the Related Art

Image processing apparatuses, such as printers or facsimiles that output digitized information and scanners that digitize documents, play an important role in a recent trend toward digitization of information. Multifunction peripherals (MFPs) are a typical example of such image processing apparatuses, which have multiple functions such as an imaging function, an image forming function, and a communication function to be used as a printer, a facsimile, a scanner, and a copier. Some multifunction peripherals extend their functions when operating in cooperation with a cloud server.

When the image forming apparatus such as the multifunction peripheral is in a status in which it is not able to communicate data with the cloud server due to improper communication settings and the like at the image forming apparatus, the image forming apparatus is not able to use functions provided by the cloud server.

In order to prompt the image forming apparatus to configure the proper settings, the cloud server managed by a service provider needs to recognize the error status of the image forming apparatus. However, when the image forming apparatus and the cloud server are not able to communicate data with each other, the cloud server is not able to directly recognize the error status of the image forming apparatus.

Such situation may occur not only in the image forming apparatus that uses the function provided by the cloud server but also in various devices that use functions provided through a network.

SUMMARY

A device management system includes an information processing apparatus, a function providing apparatus, and a log transfer apparatus. The information processing apparatus resides on a first network. The function providing apparatus resides on a second network and is configured to provide a function to the information processing apparatus through a third network to enable the information processing apparatus to perform the function provided by the function providing apparatus. The log transfer apparatus resides on the first network and is configured to communicate data with a providing-side device residing on the second network through a communication channel established between the log transfer apparatus and the providing-side device. The information processing apparatus includes first circuitry to, in response to detecting a status in which the information processing apparatus is not able to communicate data with the function providing apparatus through the third network, generate an error log containing information indicating a cause of the error, and transmit the error log to the log transfer apparatus. The function providing apparatus includes second circuitry to acquire from the providing-side device the error log transmitted via the communication channel between the log transfer apparatus and the providing-side device, and in response to acquiring the error log, detect that the information processing apparatus is in the state in which the information processing apparatus is not able to communicate data with the function providing apparatus through the third network.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

Figure 1:
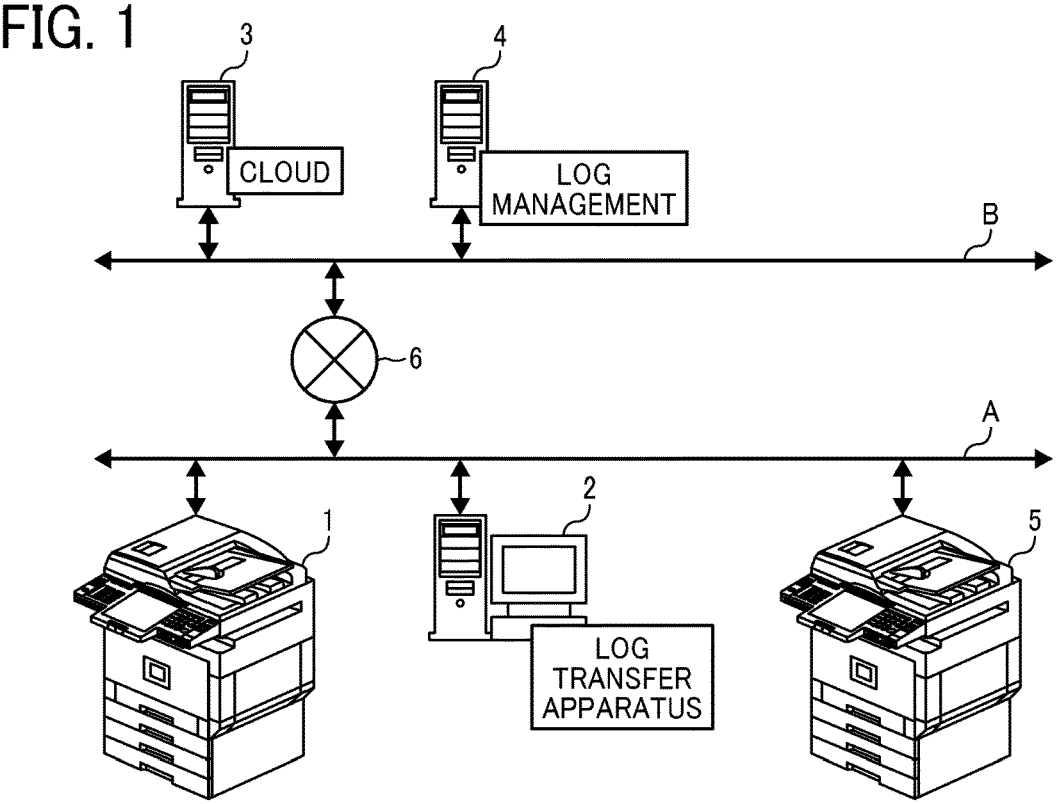
FIG. 1 is a schematic diagram illustrating a configuration of a device management system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

An example embodiment of the present invention will be described hereinafter with reference to drawings. In this embodiment, a description is given of an example of a device management system including a function providing apparatus that provides a function with an information processing apparatus through a network. One of features of this embodiment is an operation and a configuration to enable the function providing apparatus to recognize an error status of the information processing apparatus, in which the function providing apparatus and the information processing apparatus are not able to communicate data with each other.

FIG. 1 is a schematic view illustrating a configuration of the device management system according to this embodiment. As illustrated in FIG. 1, in the device management system according to this embodiment, a network A and a network B is connected via a network 6. The network 6 is, for example, a public network such as the Internet. A multifunction peripheral (MFP) 1, a log transfer apparatus 2, and an MFP 5 are connected to the network A. A cloud server 3 and a log management server 4 are connected to the network B.

The network A is a user-side network, which is a network for a user who uses a service of the device management system according to this embodiment. The network B is a provider-side network, which is a network for a service provider. The network B and the network A are each a closed network such as a local area network (LAN). In each of the network A and the network B, a device or an apparatus is capable of communicating data with another device or apparatus in a relatively simple and secure manner.

By contrast, when devices such as the MFP 1 and the cloud server 3 that are connected to different networks communicate data with each other, a rooting setting of a router that manages the network or special setting for establishing secure communication between the devices should be configured. The device management system according to this embodiment deals with an error status in which the MFP 1 and the cloud server 3 are not able to communicate data with each other because those settings are not properly configured.

The MFP 1 is a multifunction peripheral including various functions such as a printer function as an image forming apparatus, a scanner function, a copier function, and a file-server function. The MFP 1 exchanges data with the cloud server 3 to use one or more functions provided by the cloud server 3. Further, the MFP 1 according to this embodiment has a function of notifying the cloud server 3 of an error log detected by a self-diagnostic operation in a secure manner in a case in which the MFP 1 is not able to communicate data with the cloud server 3. As a mode in which the MFP 1 uses the function of the cloud server 3, the MFP 1 uses web applications installed on the cloud server 3 via a web browser of the MFP 1. For example, the MFP 1 is configured on the premise that the MFP 1 is used while being connected to the cloud server 3.

The MFP 5 is also a multifunction peripheral including various functions such as a printer function as an image forming apparatus, a scanner function, a copier function, and a file-server function. However, different from the MFP 1, the MFP 5 is used on a stand-alone basis. When an error occurs in the MFP 5, a content of the error is transmitted to the log management server 4 via the log transfer apparatus.

The log transfer apparatus 2 is an information processing apparatus capable of exchanging data with the log management server 4 in a secure manner through an encrypted transmission channel, which may be the virtual private network (VPN) encrypted transmission channel. Like the MFP 1 and the MFP 5, the log transfer apparatus 2 is also connected to the network A. Accordingly, the log transfer apparatus 2 is capable of receiving data from the MFP 1 and the MFP 5 through the network A.

The cloud server 3 is a function providing apparatus that exchanges data with the MFP 1 to provide the MFP 1 with various functions. Further, in a case in which the MFP 1 is not able to communicate data directly with the cloud server 3, the cloud server 3 according to this embodiment detects an error status of the MFP 1 through another path to manage the MFP 1.

As described above, the log management server 4 exchanges data with the log transfer apparatus 2 in a secure manner to receive and manage log information. The log information managed by the log management server 4 includes log information of errors such as an error status of the MFP 1 and an error status of the MFP 5. The log information managed by the log management server 4 also includes log information of usage history such as the number of sheets of paper printed out by the MFP 1 of the MFP 5. Like the cloud server 3, the log management server 4 is also connected to the network B. Accordingly, the log management server 4 is capable of exchanging data with the cloud server 3 via the network B.

Each of the log transfer apparatus 2 and the log management server 4 has a root certificate for verifying the certificate of the other. Accordingly, the log transfer apparatus 2 and the log management server 4 mutually authorize each other. Thus, in addition to the secure encrypted transmission channel described above, a communication channel that is highly reliable is configured between the log transfer apparatus 2 and the log management server 4.

Figure 2:
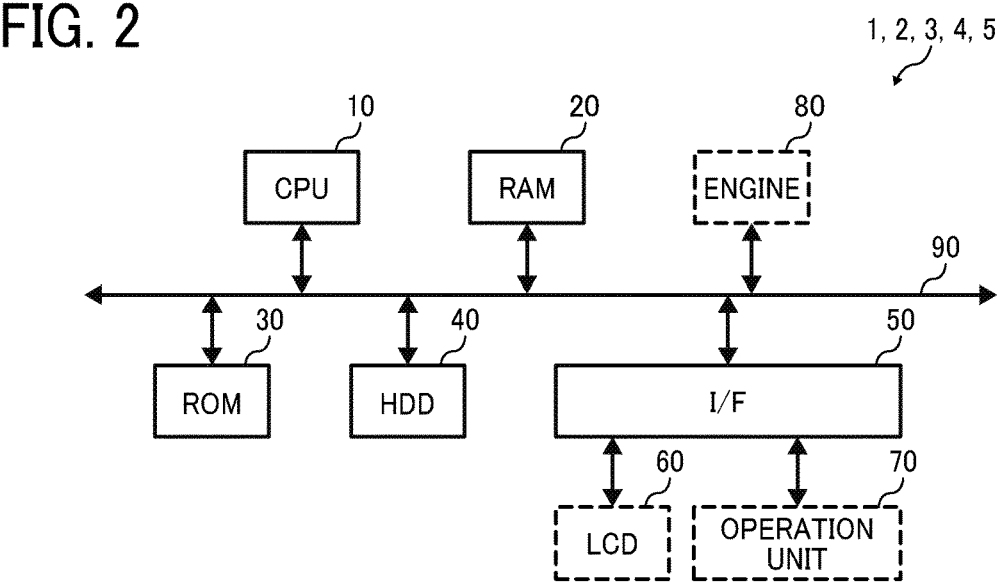
FIG. 2 is a block diagram illustrating a hardware configuration of an information processing apparatus according to an embodiment of the present invention.

Hereinafter, a description is given of a hardware configuration of an information processing apparatus implementing any one of the MFP 1, the MFP 5, the log transfer apparatus 2, the cloud server 3, and the log management server 4 according to this embodiment. FIG. 2 is a block diagram illustrating a hardware configuration of the information processing apparatus according to this embodiment.

As illustrated in FIG. 2, the information processing apparatus according to this embodiment has the similar or substantially the similar hardware configuration as that of a typical server or a typical personal computer. Specifically, the information processing apparatus according to this embodiment includes a central processing unit (CPU) 10, a random access memory (RAM) 20, a read only memory (ROM) 30, a hard disc drive (HDD) 40, and an interface (I/F) 50, which are connected to one another via a bus 90. In addition, the information processing apparatus includes a liquid crystal display (LCD) 60, an operation unit 70, and an engine 80, which are connected to the I/F 50.

The CPU 10 is a processor, which controls an entire operation of the information processing apparatus. The RAM 20 is a high-speed read/write volatile storage medium. The CPU 10 uses the RAM 20 as a work area in processing data. The ROM 30 is a read-only non-volatile storage medium that stores programs such as firmware. The HDD 40 is a read/write non-volatile storage medium that stores an operating system (OS), various control programs, and application programs.

The I/F 50 connects the bus 90 to various hardware resources or a network for control. The LCD 60 is a visual user interface that allows a user to recognize a status of the information processing apparatus. The operation unit 70 is a user interface that allows a user to input data to the information processing apparatus. The engine 80 is hardware such as a printer engine and a scanner engine dedicated to the MFP 1 or the MFP 5. Note that the cloud server 3 and the log management server 4 each operate as a server. Accordingly, in the cloud server 3 or the log management server 4, the user interface such as the LCD 60 and the operation unit 70, and the engine 80 may be omitted.

Figure 6:
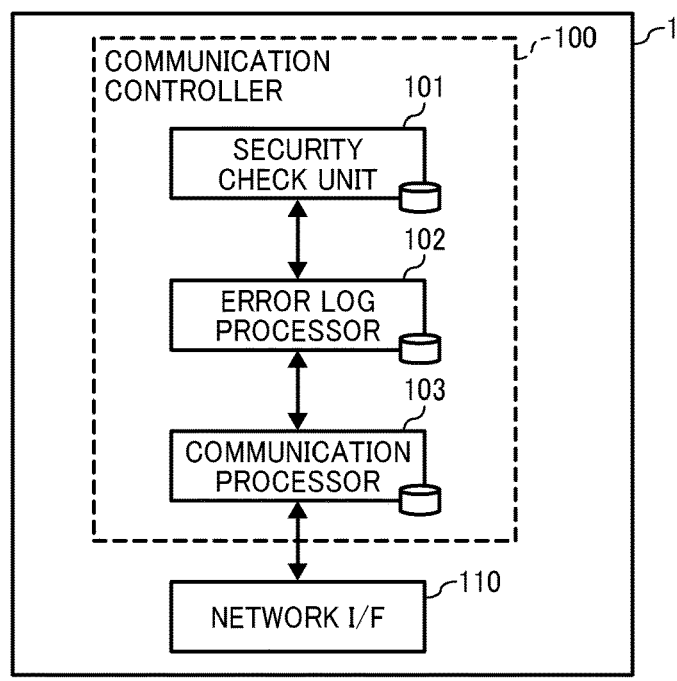
FIG. 6 is a block diagram illustrating a functional configuration of a multifunction peripheral according to an embodiment of the present invention.
Figure 7:
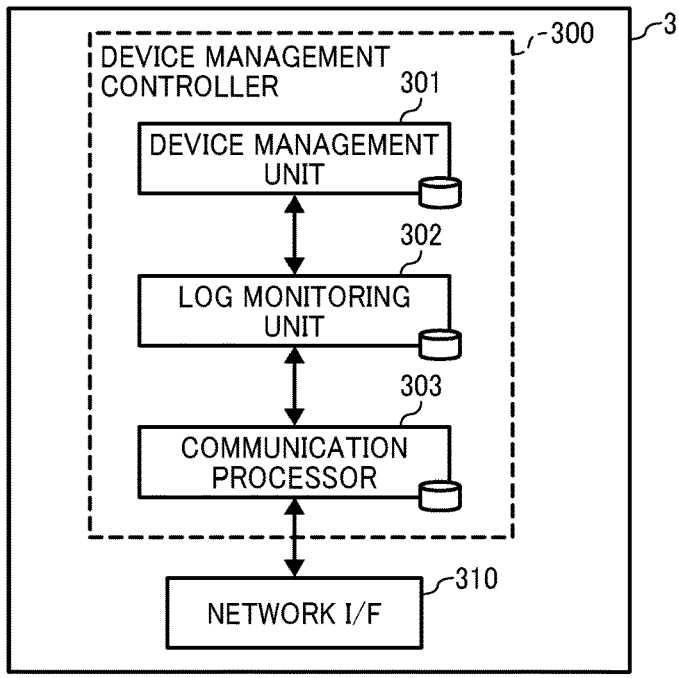
FIG. 7 is a block diagram illustrating a functional configuration of a cloud server according to an embodiment of the present invention.

With this hardware configuration, the CPU 10 executes processing according to a program that is stored in the ROM 30, the HDD 40 or a recording medium such as an optical disc and loaded to the RAM 20 to function as a software controller. The software controller operates in cooperation with hardware to implement one or more functional blocks of the information processing apparatus such as the MFP 1 and the cloud server 3 as illustrated in FIGS. 6 and 7.

Figure 3:
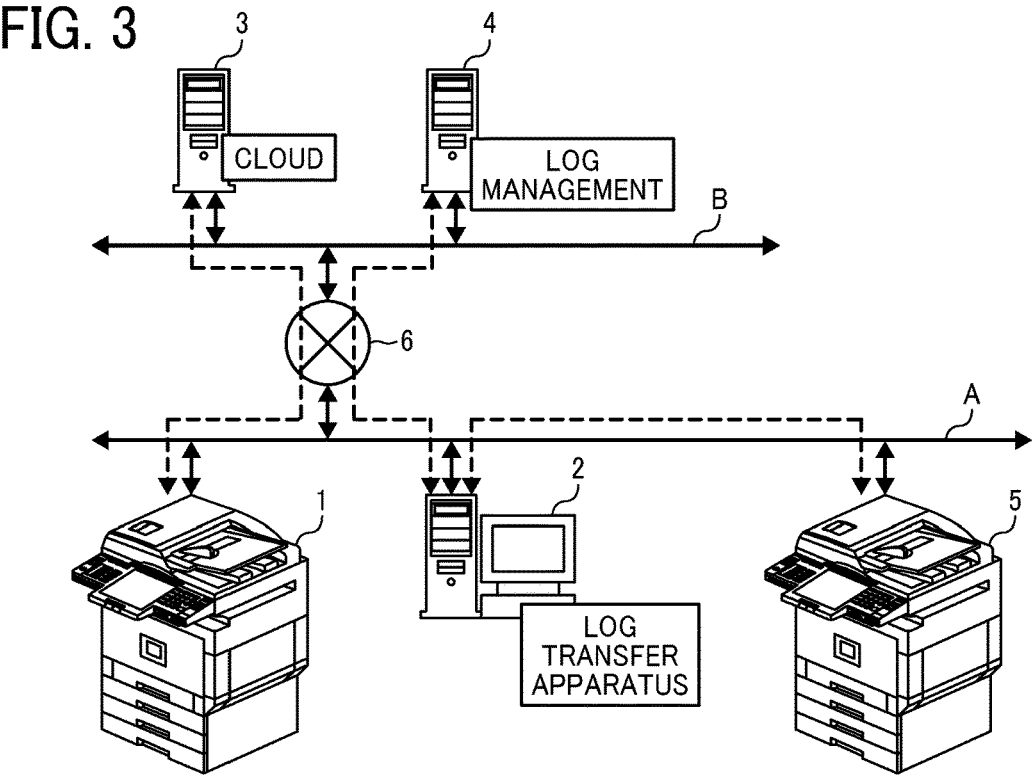
FIG. 3 is a schematic diagram illustrating a communication channel when the system operates normally according to an embodiment of the present invention.

FIG. 3 is a schematic diagram illustrating a network connection status of each apparatus or device constituting the device management system according to this embodiment. When the device management system operates normally, the MFP 1, the log transfer apparatus 2, and the MFP 5 respectively exchange data with the cloud server 3, the log management server 4, and the log transfer apparatus 2, as illustrated in FIG. 3. Each of the data communications is performed in a secure manner while encrypted with the VPN and the like as described above. In this network connection status, for example, when an error due to the abnormality of the scanner engine or the printer engine occurs in the MFP 1, the MFP 1 transmits a content of the error to the cloud server 3. Accordingly, the cloud server 3 recognizes the content of the error occurred in the MFP 1. Examples of the error due to the abnormality of the scanner engine or the printer engine include a paper jam, an out-of-paper, and an out-of-toner. By contrast, when the similar error occurs in the MFP 5, the MFP 5 transmits the content of the error to the log transfer apparatus 2. The log transfer apparatus 2 transmits the content of the error received from the MFP 5 to the log management server 4.

Figure 4:
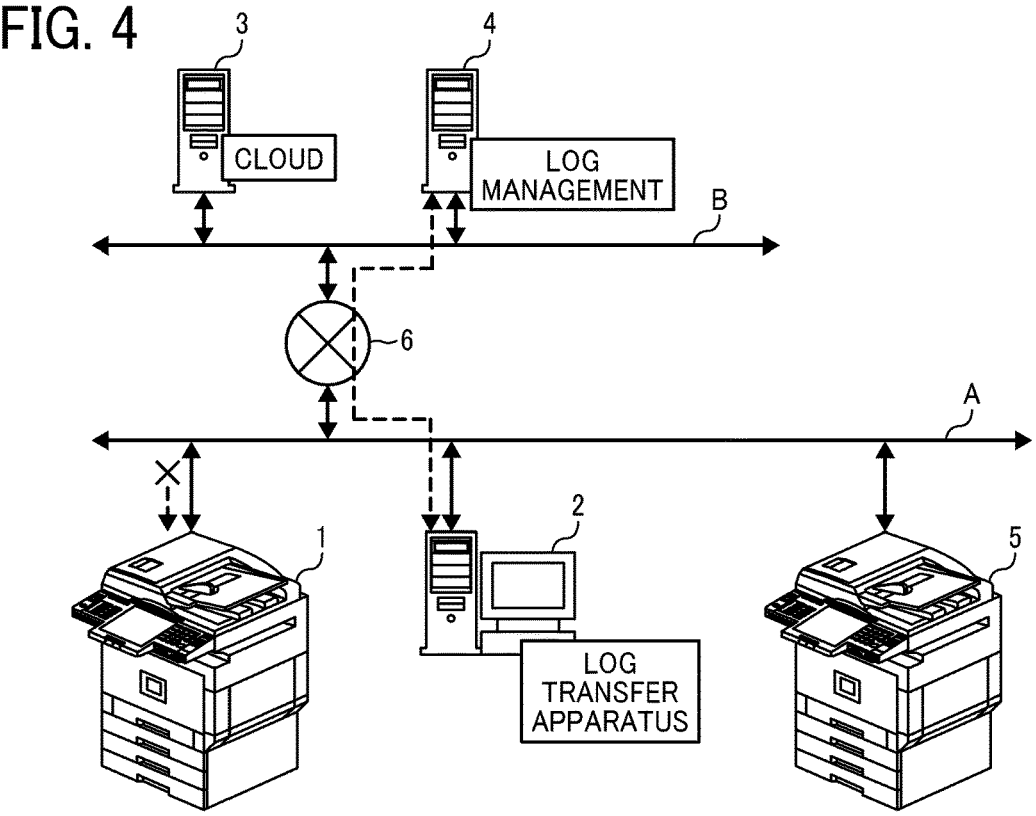
FIG. 4 is a schematic diagram illustrating the communication channel when an error occurs in the system according to an embodiment of the present invention.

By contrast, the device management system according to this embodiment deals with the error status in which, as illustrated in FIG. 4, the MFP 1 and the cloud server 3 are not be able to directly communicate data with each other due to improper communication settings at the MFP 1. The error status as illustrated in FIG. 4 is caused by, for example, improper communication settings such as improper proxy settings in the MFP 1. Further, this error status occurs because necessary software is not installed on the MFP 1, for example.

Figure 5:
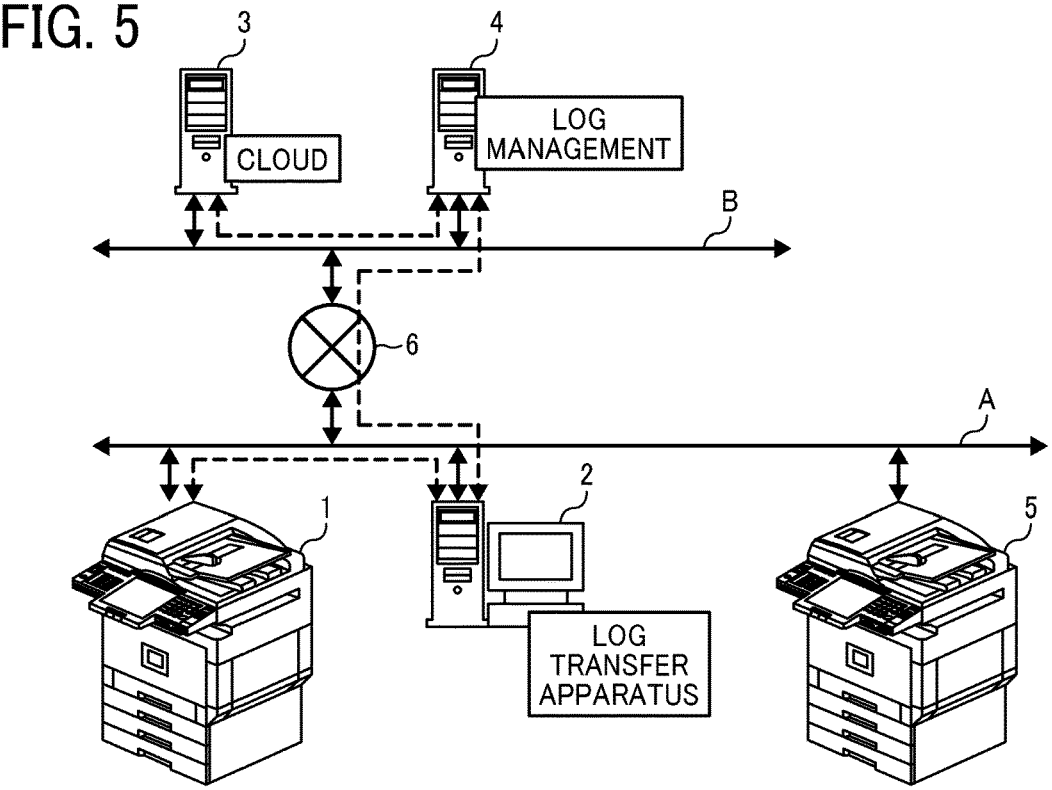
FIG. 5 is a schematic diagram illustrating the communication channel for restoration when an error occurs in the system according to an embodiment of the present invention.

FIG. 5 is a schematic diagram illustrating a communication channel configured to enable the cloud server 3 to detect the above-described error status. As illustrated in FIG. 5, the MFP 1 exchanges data with the log transfer apparatus 2 via the network A to notify the log transfer apparatus 2 of the error log.

As described above, the MFP 1 and the log transfer apparatus 2 are both connected to the network A. Accordingly, even when the MFP 1 is not able to communicate data with the cloud server 3 due to the improper communication settings, the MFP 1 is still able to communicate data with the log transfer apparatus 2. In this case, to enhance information security of the error log, the MFP 1 verifies the log transfer apparatus 2 as a communication destination when the MFP 1 transmits the error log to the log transfer apparatus 2.

The log transfer apparatus 2 transmits the error log received from the MFP 1 to the log management server 4 through the above-described secure communication. The log management server 4 stores the error log transmitted from the log transfer apparatus 2 in a storage medium such as the HDD 40 for to manage the error log. The cloud server 3 periodically monitors the error log managed in the log management server 4. In response to detecting at least one new error log stored in the log management server 4, the cloud server 3 acquires the new error log.

Thus, the device management system according to this embodiment notifies the network B side of the error log through the secure communication between the log transfer apparatus 2 and the log management server 4 when the MFP 1 and the cloud server 3 are not able to communicate data with each other. Accordingly, the cloud server 3 recognizes the error status of the MFP 1.

Hereinafter, a description is given of a configuration of the MFP 1 implementing functions according to this embodiment with reference to FIG. 6. As illustrated in FIG. 6, the MFP 1 includes a communication controller 100, which is implemented by the CPU 10 when executing the program loaded to the RAM 20, to communicate data with external devices via a network interface (I/F) 110 of the MFP 1. The communication controller 100 includes a security check unit 101, an error log processor 102, and a communication processor 103.

The security check unit 101 is implemented by the CPU 10 when executing the program loaded to the RAM 20. When the MFP 1 is activated, the security check unit 101, checks a status and a communication function of the MFP 1, and a communication status between the MFP 1 and the cloud server 3. The security check unit 101 generates the error log based on the check result, and stores the generated error log. This error log is transferred to the log transfer apparatus 2.

The error log processor 102 is implemented by the CPU 10 when executing the program loaded to the RAM 20. The error log processor 102 attaches an electronic signature to the error log generated by the security check unit 101, and encrypts the error log. The error log processor 102 has information of a secrete key for the electronic signature of the MFP 1 and a public key of the cloud server 3, which may be previously stored in its internal memory.

The communication processor 103 is implemented by the CPU 10 when executing the program loaded to the RAM 20. The communication processor 103 performs control for enabling the MFP 1 to communicate data with external devices. The communication processor 103 establishes a communication channel between the MFP 1 and the cloud server 3, in a case in which the MFP 1 operates as intended. Further, the MFP 1 according to this embodiment authenticates the log transfer apparatus 2 when the MFP 1 communicates data with the log transfer apparatus 2. The communication processor 103 has the root certificate of the log transfer apparatus 2, which may be previously stored in its internal memory.

FIG. 7 is a block diagram illustrating a configuration of the cloud server 3 implementing functions according to this embodiment. As illustrated in FIG. 7, the cloud server 3 includes a device management controller 300, which is implemented by the CPU 10 when executing the program loaded to the RAM 20, to communicate data with external devices via a network I/F 310. The device management controller 300 includes a device management unit 301, a log monitoring unit 302, and a communication processor 303.

The device management unit 301 is implemented by the CPU 10 when executing the program loaded to the RAM 20. The device management unit 301 recognizes and manages the error status of the MFP 1 in the cloud server 3. According to this embodiment, the device management unit 301 acquires the error log generated in the MFP 1.

The log monitoring unit 302 monitors the management status of the error log in the log management server 4 via the network B. When a new error log is stored in the log management server 4, the log monitoring unit 302 acquires the new error log via the network B. In response to acquiring the new error log, the log monitoring unit 302 decrypts the encrypted data and also verifies the electronic signature attached to the data. For this reason, the log monitoring unit 302 has information of a secrete key of the cloud server 3 and a public key of the MFP 1.

The communication processor 303 is implemented by the CPU 10 when executing the program loaded to the RAM 20. The communication processor 303 performs control for enabling the cloud server 3 to communicate data with external devices. The communication processor 303 establishes a communication channel between the MFP 1 and the cloud server 3, in a case in which the MFP operates as intended. For this reason, the communication processor 303 has the root certificate of the MFP 1.

Figure 8:
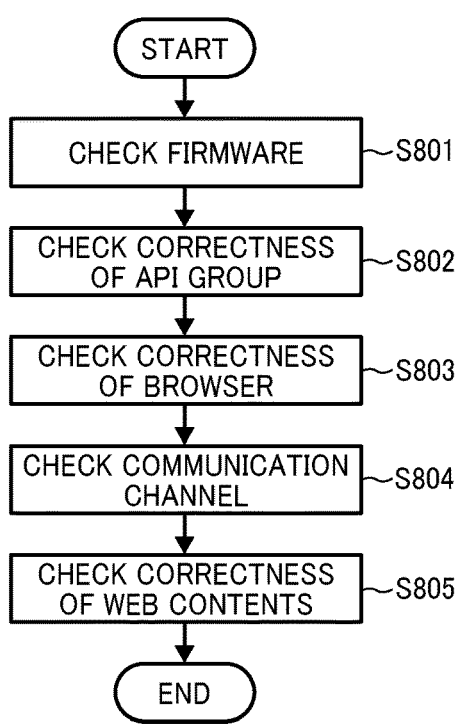
FIG. 8 is a flowchart illustrating an operation of checking an error according to an embodiment of the present invention.

Hereinafter, a description is given of example operations of the device management system according this embodiment. First, a description is given of an operation of checking an error by the security check unit 101 of the MFP 1 with reference to FIG. 8. As illustrated in FIG. 8, the security check unit 101 firstly checks a firmware (S801). Specifically, at S801, the security check unit 101 performs an electronic signature verification with a security chip, Trusted Platform Module (TPM) to check the tampering of the firmware.

Next, the security check unit 101 verifies an application program interface (API) group (S802). Specifically, at S802, the security check unit 101 performs the electronic signature verification with a security chip, Trusted Platform Module (TPM) to check the tampering of the API group.

Further, the security check unit 101 verifies a browser (S803). Specifically, at S803, the security check unit 101 performs a signature verification with a root certificate of an application distribution server to check the tampering of the browser.

Furthermore, the security check unit 101 checks the communication channel (S804). Specifically, at S803, the security check unit 101 authenticates a server with a server certificate, authenticates a client with a client certificate, and checks an encrypted channel with the transport layer security (TLS), for example.

Next, the security check unit 101 verifies web contents (S805). Specifically, at S805, the security check unit 101 performs a signature verification with the root certificate of the application distribution server to check the tampering of the web contents.

At a timing when the check result at any one of S801 to S805 indicates an error, the security check unit 101 generates an error log indicating a content of the check. The error log includes a date when the error has been detected, an identifier that identifies the MFP 1 in which the error has occurred, and an error identifier indicating the content of error. When the check at any one of S801 to S805 results in error, the MFP 1 is in the error status, in which the MFP 1 is not able to communicate data with the cloud server 3.

Figure 9:
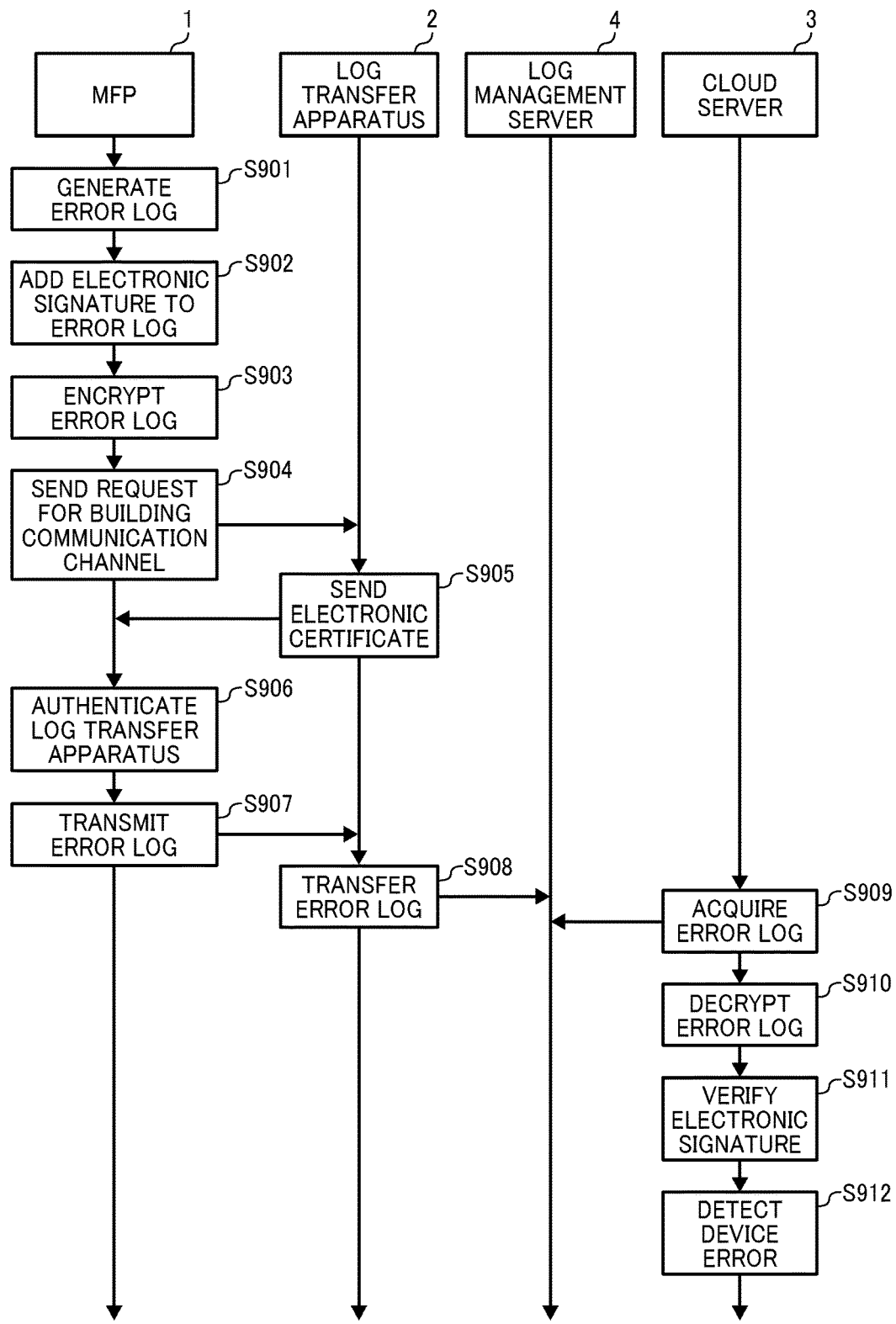
FIG. 9 is a sequence diagram illustrating an operation of detecting an error performed by the device management system according to an embodiment of the present invention.
Figure 10:
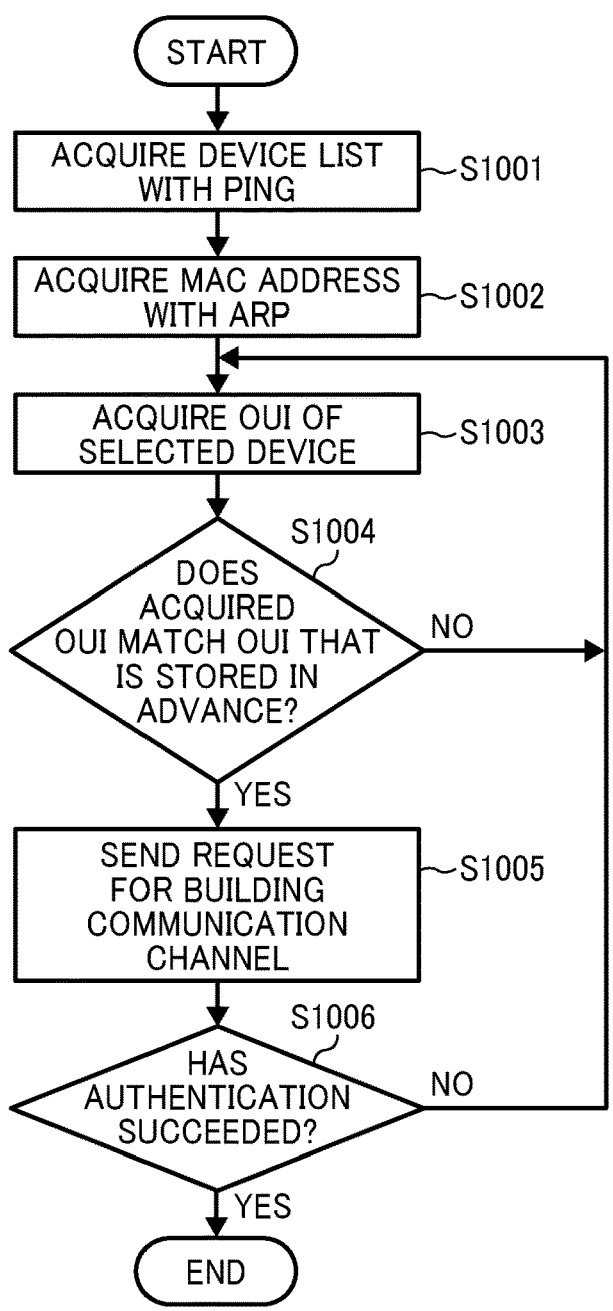
FIG. 10 is a flowchart illustrating an operation of searching for a log transfer apparatus performed by the multifunction peripheral according to an embodiment of the present invention.

Hereinafter, a description is given of an operation performed by the device management system when the error log is generated with reference to FIG. 9. As illustrated in FIG. 9, when the MFP 1 generates the error log (S901), the error log processor 102 attaches the electronic signature to the error log (S902). Further, the error log processor 102 encrypts the error log (S903).

Specifically, at S902, the error log processor 102 performs the electronic signature with the secrete key of the MFP 1 and attaches the public key for the verification of the electronic signature at the cloud server 3. Thus, even in a case in which the cloud server 3 is not capable of acquiring data from the MFP 1, the cloud server 3 is able to verify the electronic signature of the MFP 1. Further, at S903, the error log processor 102 encrypts the error log with the public key of the cloud server 3. Thus, the error log is encrypted such that only the cloud server 3 decrypts the error log.

After the attachment of the electronic signature to the error log and the encryption of the error log, the communication processor 103 requests the log transfer apparatus 2 to build the communication channel (S904). In response to receiving the request for building the channel from the MFP 1, the log transfer apparatus 2 sends the electronic certificate of the log transfer apparatus 2 (S905). In response to receiving the electronic certificate from the log transfer apparatus 2, the communication processor 103 of the MFP 1 authenticates the log transfer apparatus 2 with the root certificate of the log transfer apparatus 2 (S906).

After the communication channel is built between the MFP 1 and the log transfer apparatus 2 based on the verification at S906, the MFP 1 transmits, to the log transfer apparatus 2, the error log to which the electronic signature has been attached and the encryption has been performed (S907). In response to receiving the error log from the MFP 1, the log transfer apparatus 2 transfers the error log through the encrypted transmission channel between the log transfer apparatus 2 and the log management server 4 (S908). Thus, the error log of the MFP 1 is stored in the log management server 4.

In the cloud server 3, as described above, the log monitoring unit 302 monitors the error log stored in the log management server 4 via the network B. Accordingly, when a new error log is stored in the log management server 4, the cloud server 3 acquires the new error log from the log management server 4 (S909). For example, the cloud server 3 retrieves the error log from the log management server 4 with the identifier of the MFP 1 included in the error log. Alternatively, for example, the MFP 1 attaches an identifier of the cloud server 3 as a connection destination to the error log, and the cloud server 3 retrieves the error log from the log management server 4 with the identifier of the cloud server 3. When the cloud server 3 acquires the new error log, the log monitoring unit 302 decrypts the acquired new error log with the secrete key of the cloud server 3 (S910). Further, the log monitoring unit 302 verifies the electronic signature with the public key of the MFP 1 (S911).

The log monitoring unit 302 provides the device management unit 301 with the decrypted and verified error log. Thus, the device management unit 301 detects the device error of the MFP 1 (S912). Thus, the operation of detecting the error status of the MFP 1 by the device management system according to this embodiment ends.

When the MFP 1 requests the log transfer apparatus 2 to build the communication channel at S904, the MFP 1 needs to perform this operation of transmitting the request while recognizing the log transfer apparatus 2. Hereinafter, a description is given of an operation of recognizing the log transfer apparatus 2 to transmit the request for building the communication channel. First, the communication processor 103 acquires a list of IP addresses existing in the LAN with the Ping command (S1001).

Next, the communication processor 103 acquires a media access control (MAC) address of each of the IP addresses acquired with the Ping command with the address resolution protocol (ARP) (S1002). Further, after the acquisition of the MAC addresses at S1002, the communication processor 103 selects one of the acquired MAC address and acquires an organizationally unique identifier (OUI) of the selected MAC address (S1003).

The communication processor 103 stores, in advance, the OUI of a vendor of a target device with which the communication channel is to be built, in order to identify the log transfer apparatus 2 to which the error log is to be transferred. The communication processor determines whether the OUI acquired at S1003 matches with the OUI stored in advance. When the determination indicates that the OUI does not match the OUI of the target vendor stored in advance (S1004: NO), the operation returns to S1003 to repeat the processing of S1003.

By the contrast, when the OUI acquired at S1003 matches with the OUI of the target vendor stored in advance (S1004: YES), the communication processor 103 transmits the request for building the communication channel as at S904 to the IP address corresponding to the OUI (S1005). In response to receiving the server certificate from the device (the log transfer apparatus 2) to which the request for building the communication channel is transmitted, the MFP 1 verifies the certificate for server authentication. When the server authentication has succeeded (S1006: YES), the channel is built between the MFP 1 and the log transfer apparatus, and the processing ends. By contrast, when the server authentication has failed (S1006: NO), the processing returns to S1003 to repeat the processing from S1003.

Figure 11:
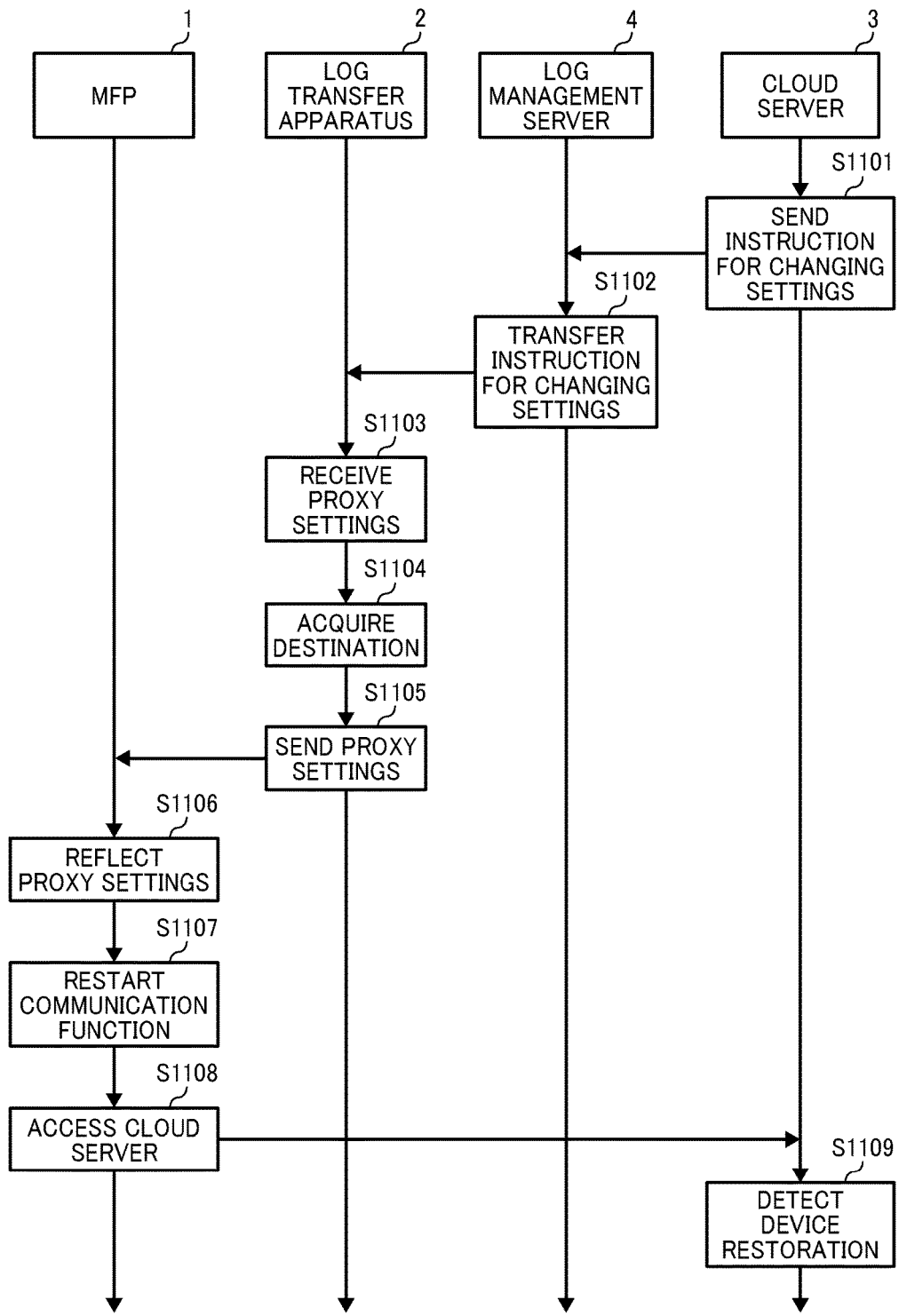
FIG. 11 is a sequence diagram illustrating an operation of taking measures against the error performed by the device management system according to an embodiment of the present invention.

Hereinafter, a description is given of an operation performed by the device management system when the cloud server 3 detects the device error as at S912. FIG. 11 is a flowchart illustrating an operation by the device management system in a case in which the improper proxy settings at the MFP 1 causes the error status. As illustrated in FIG. 11, in response to detecting the error, the device management unit 301 instructs the log management server 4 to take measures against the error in accordance with the error identifier contained in the error log. Specifically, the device management unit 301 transmits, to the log management server 4, an instruction to change settings indicating an instruction to configure proxy settings (S1101).

The instruction transmitted at S1101 includes the identifier of the target device, i.e., the MFP 1 on which the setting change is to be performed as well as the information indicating the content of the measures against the error such as the instruction to configure the proxy settings as described above. These information items are used as an instruction to take measures against the error in accordance with the content of error log.

The log management server 4 stores the new instruction to change the settings transmitted from the cloud server 3. Further, the log management server 4 transfers the instruction to the log transfer apparatus 2 (S1102). At S1102, in the same or substantially the same manner as S908 of FIG. 9, the log management server 4 transfers the instruction to change the settings through the encrypted transmission channel between the log transfer apparatus 2 and the log management server 4.

In response to receiving the instruction to change the settings indicating the instruction to configure the proxy settings, the log transfer apparatus 2 acquires the proxy settings of the log transfer apparatus 2 itself as a setting content of the proxy (S1103). In this embodiment, the same service provider is assumed to provide the cloud server 3 and the log management server 4.

Because the log transfer apparatus 2 and the log management server 4 are able to communicate data with each other through the encrypted transmission channel, there is a high possibility that the communication between the MFP 1 and the cloud server 3 that resides on the network B is established with the same proxy settings as those of the log transfer apparatus 2. Accordingly, the log transfer apparatus 2 acquires the proxy settings of the log transfer apparatus 2 itself to transmit the proxy setting to the MFP 1.

After acquiring the proxy settings, the log transfer apparatus 2 acquires a destination to which the log transfer apparatus 2 transmits the proxy setting (S1104). Specifically, as S1104, the log transfer apparatus 2 acquires information of the destination based on the identifier of the device included in the instruction to change the settings. In a case in which an IP address is used as the identifier of the device, the identifier of the device is used as the transmission destination.

Alternatively, when the log transfer apparatus 2 receives the error log from the MFP 1 at S907 of FIG. 7, the log transfer apparatus 2 may store the IP address of the MFP 1 from which the error log is transmitted in association with the device identifier. In this case, at S1104 of FIG. 11, the log transfer apparatus 2 acquires, as the transmission destination, the IP address associated with the device identifier included in the instruction to change the settings based on the information associating the IP address with the device identifier.

After acquiring the destination to which the instruction to change the settings is to be transmitted, the log transfer apparatus 2 transmits the proxy settings received at S1103 to the destination (S1105). In response to receiving the proxy settings from the log transfer apparatus, the communication processor 103 of the MFP 1 reflects the proxy settings (S1106), and restarts the communication function (S1107).

This restart of the communication function causes the security check unit 101 of the MFP 1 to perform the check operation described above with reference to FIG. 8 again. In a case in which the MFP 1 and the cloud server 3 become able to communicate data with each other with the proxy settings reflected at S1106, the MFP 1 accesses the cloud server 3 (S1108). In response to accepting the access from the MFP 1, the device management unit 301 of the cloud server 3 detects the restoration of the MFP 1 (S1109). Then, the device management unit 301 deletes the error log. Thus, the operation of restoring the communication between the cloud server 3 and the MFP 1 according to this embodiment ends.

Figure 12:
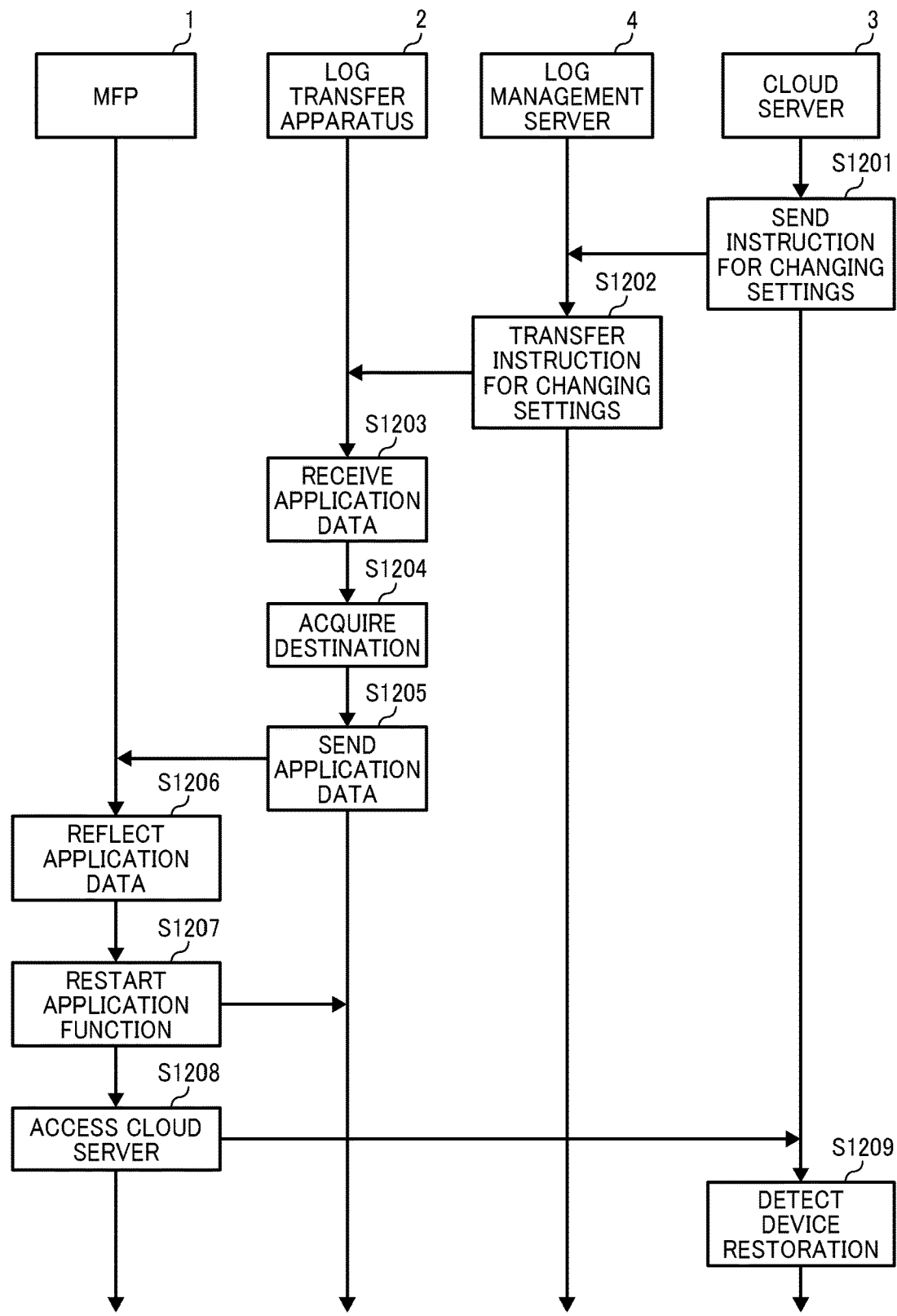
FIG. 12 is a sequence diagram illustrating an operation of taking measures against the error performed by the device management system according to an embodiment of the present invention.

FIG. 12 is a flowchart illustrating an operation performed by the device management system in a case in which the error status is caused due to improper settings of applications in the MFP 1 or the lack of installation of necessary application in the MFP 1. As illustrated in FIG. 12, in response to detecting the error, the device management unit 301 instructs the log management server 4 to take measures against the error in accordance with the error identifier contained in the error log. Specifically, the device management unit 301 transmits, to the log management server 4, an instruction to change settings indicating an instruction to update the application (S1201).

The instruction transmitted at S1201 includes the identifier of the target device, i.e., the MFP 1 on which the setting change is to be performed as well as the information indicating the content of the measures against the error such as the instruction to updating the application as described above.

The log management server 4 stores the new instruction to change the settings transmitted from the cloud server 3. Further, the log management server 4 transfers the instruction to the log transfer apparatus 2 (S1202). At S1202, in the same or substantially the same manner as S908 of FIG. 9, the log management server 4 transfers the instruction to change the settings through the encrypted transmission channel between the log transfer apparatus 2 and the log management server 4.

In response to receiving the instruction to change the settings indicating the instruction to update the application, the log transfer apparatus 2 downloads data of the application to be updated from an application management server (S1203). After downloading the application data of the target of update, the log transfer apparatus 2 acquires the destination to which the log transfer apparatus 2 transmits the application data in the same of the substantially same manner as S1104 (S1204).

After acquiring the destination to which the instruction to change the settings is to be transmitted, the log transfer apparatus 2 transmits the application data downloaded at S1203 to the destination (S1205). In response to receiving the application data, a service that manages installing applications performs an installation processing of the application to reflect the application data (S1206). After the application data is reflected, the service that manages applications restarts the function of managing the application.

This restart of the application management function causes the security check unit 101 of the MFP 1 to perform the check operation described above with reference to FIG. 8 again. In a case in which the MFP 1 and the cloud server 3 become able to communicate data with each other with the update of the application at S1206, the MFP 1 accesses the cloud server 3 (S1208). After S1208, the same or substantially the same processing as FIG. 11 is performed. Thus, the operation of restoring the communication between the cloud server 3 and the MFP 1 according to this embodiment ends.

As described heretofore, in a case in which the MFP 1 and the cloud server 3 are not able to communicate data with each other, the device management system according to this embodiment notifies the cloud server 3 of the error log through the encrypted transmission channel between the log transfer apparatus 2 and the log management server 4. Accordingly, in a status in which the function providing apparatus and the information processing apparatus that is provided with the function by the function providing apparatus are not able to communicate data directly with each other, the function providing apparatus is able to recognize such status. Further, the data communication is performed through the encrypted transmission channel between the log transfer apparatus 2 and the log management server 4, the information security of the error log is maintained.

In the embodiment described heretofore, a description is given of an example case in which the error log is transmitted to the log transfer apparatus 2 that communicates data with the log management server 4 through the encrypted transmission channel, the log management server 4 being connected to the network B, and the error log is transmitted to the cloud server 3 via the log management server 4. In other words, a description is given heretofore of an example case in which the log management server 4 is a providing-side device, which is a device that resides on the same network B as the function providing apparatus (cloud server 3). Alternatively, the encrypted communication channel may be established between the log transfer apparatus 2 and the cloud server 3. In this case, the error log may be transmitted from the log transfer apparatus 2 directly to the cloud server 3. In this case, the cloud server 3 functions as the providing-side device.

In other words, in the device management system according to this embodiment, when the error log is generated, the error log is transmitted to an apparatus having a communication path connected to a device residing on the network B to which the cloud server 3 is connected. Further, the error log is transmitted to the cloud server 3 via the communication path that the apparatus has.

Figure 13:
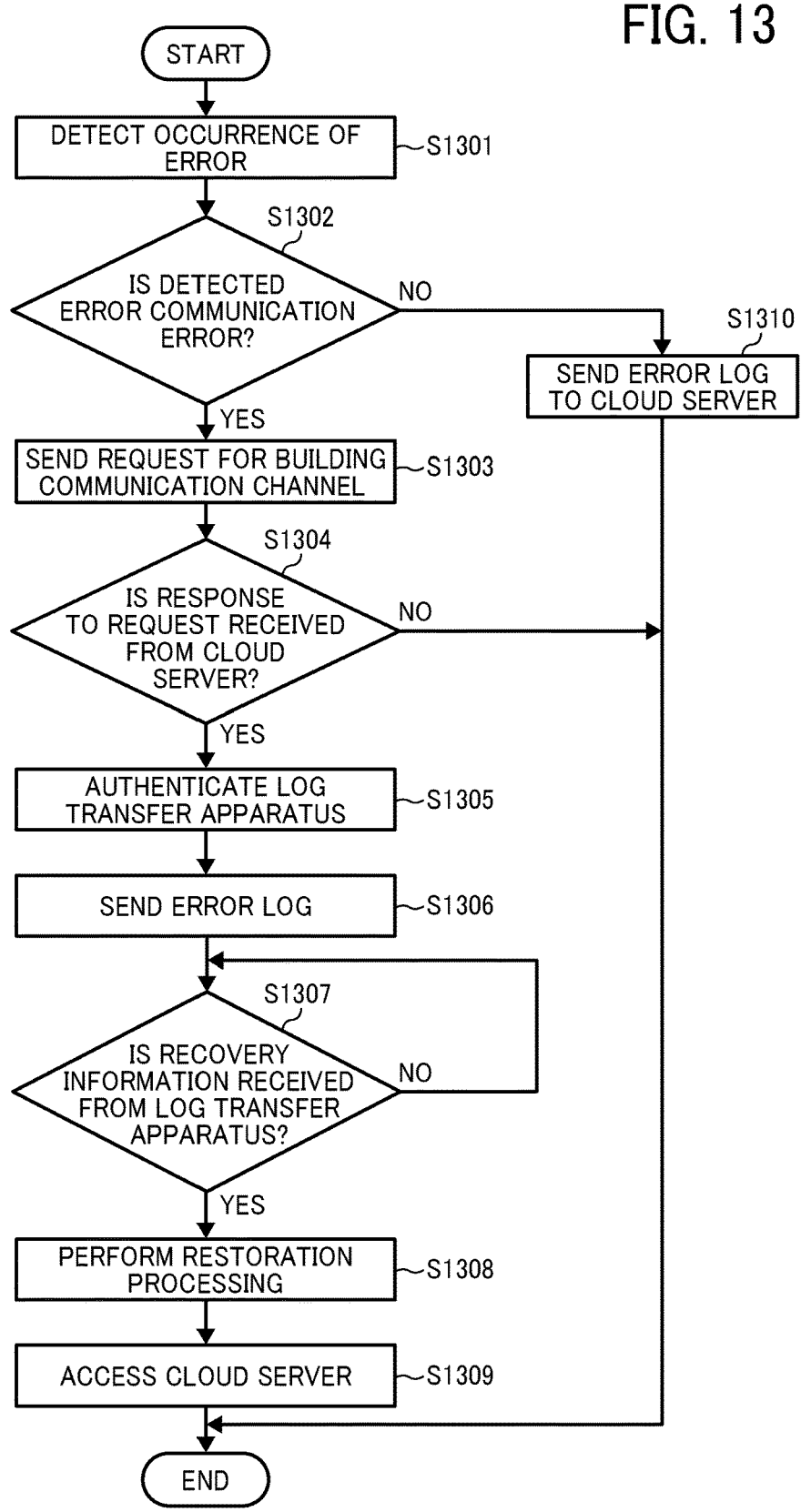
FIG. 13 is a flowchart illustrating an operation taking measures against the error performed by the multifunction peripheral according to an embodiment of the present invention.

Hereinafter, a description is given of an operation performed by the MFP 1 according to the above-described embodiment with reference to FIG. 13. As described heretofore, multiple types of error occur in an operation of the MFP 1. Examples of the types of error include an error in the scanner engine or the printer engine of the MFP 1. The MFP 1 detects an occurrence of error indicating an abnormal operation, including the error in the scanner engine or the printer engine and a communication error (S1301). The MFP 1 determines whether the error detected at S1301 is the communication error. When the MFP 1 determines that the error detected at S1301 is the error due to the abnormality of the scanner engine or the printer engine (S1302: NO), the MFP 1 transmits the content of the error to the cloud server 3 (S1310).

By contrast, when the MFP 1 determines that the error detected at S1301 in the communication error (S1302: YES), the communication processor 103 of the MFP 1 requests the log transfer apparatus 2 to build the communication channel (S1303).

The transmission of the request for building the communication channel at S 1303 is performed in the same or substantially the same manner as S904 described above. In other words, when the MFP 1 requests the log transfer apparatus 2 to build the communication channel at S1303, the MFP 1 needs to perform this operation of transmitting the request while recognizing the log transfer apparatus 2. For this reason, the communication processor 103 acquires the list of IP addresses existing in the LAN (network A) with the Ping command. Further, the communication processor 103 acquires the MAC address of each of the acquired IP addresses with the ARP. Subsequently, the communication processor 103 selects one of the acquired MAC addresses, and acquires the OUI of the selected MAC address. Further, the communication processor 103 determines whether the acquired OUI matches with the OUI stored in advance by the communication processor 103. When the determination indicates that the OUI does not match the OUI of the target vendor, the communication processor 103 repeats the processing from the acquisition of the OUI. By the contrast, when the acquired OUI matches with the OUI of the target vendor, the communication processor 103 transmits the request for building the communication channel to the IP address corresponding to the OUI.

Subsequently, the communication processor 103 determines whether the communication processor 103 receives a response to the request for building the communication channel transmitted at S1303 from the log transfer apparatus 2 (S1304). Specifically, the communication processor 103 determines whether the electronic certificate of the log transfer apparatus 2 is transmitted to determine whether the response is received from the log transfer apparatus 2. When the communication processor 103 determines that the response is not received from the log transfer apparatus 2 (S1304: NO), this operation ends. By contrast, when the communication processor 103 receives the electronic certificate from the log transfer apparatus 2 (S1304: YES), the communication processor 103 verifies the log transfer apparatus 2 using the root certificate of the log transfer apparatus 2 (S1305). The MFP 1 connects to the log transfer apparatus 2.

After the communication channel is built between the MFP 1 and the log transfer apparatus 2 based on the verification at S1305, the MFP 1 transmits, to the log transfer apparatus 2, the error log to which the electronic signature has been attached and the encryption has been performed (S1306).

After transmitting the error log to the log transfer apparatus 2 at S1306, the MFP 1 keeps waiting until the MFP 1 receives restoration information from the log transfer apparatus 2 (S1307: NO). This restoration information includes the instruction to change the settings for changing the proxy settings at the MFP 1, and the application data of the update target based on the instruction to change the settings indicating the update of the application.

In response to receiving the restoration information from the log transfer apparatus 2 (S1307: YES), the communication processor 103 performs a restoration processing of reflecting the restoration information (S1308). Specifically, in a case in which the restoration information received from the log transfer apparatus 2 is the proxy settings, the communication processor 103 reflects the proxy settings at S1308. Alternatively, in a case in which the restoration information received from the log transfer apparatus 2 is the application data, the service that manages installing applications performs an installation processing of the application to reflect the application data at S1308. After reflecting the proxy settings at S1308, the communication processor 103 restarts the communication function. Alternatively, after reflecting the application data at S1308, the service that manages applications restarts the function of managing the application.

This restart of the communication function or the application management function causes the security check unit 101 of the MFP 1 to perform the check operation described above with reference to FIG. 8 again. In a case in which the MFP 1 and the cloud server 3 become able to communicate data with each other with the proxy settings reflected at S1308 or with the application updated at S1308, the MFP 1 accesses the cloud server 3 (S1309).

Thus, the operation of transmitting the error log that is generated when the error occurs in the MFP 1 to the cloud server 3 ends. In response to accepting the access from the MFP 1, the device management unit 301 of the cloud server 3 detects the restoration of the MFP 1, and deletes the error log.

As described heretofore, according to this embodiment, even in a case in which the MFP 1 as the apparatus that uses function provided by the function providing apparatus is in a status in which it is not able to communicate data with the cloud server 3 as the function providing apparatus, the cloud server 3 is able to recognize the status of the MFP 1.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. A device management system comprising:
an information processing apparatus residing on a first network;
a function providing apparatus residing on a second network and configured to provide a function to the information processing apparatus to enable the information processing apparatus to perform the function provided by the function providing apparatus; and
a log transfer apparatus residing on the first network and configured to communicate data with a providing-side device residing on the second network through a communication channel established between the log transfer apparatus and the providing-side device,
the information processing apparatus including first circuitry to,
generate an error log, in response to detecting a status indicating an error in which the information processing apparatus is not able to communicate data with the function providing apparatus, the error log including information indicating a cause of the error indicated by the status detected, and
transmit the error log to the log transfer apparatus, and the function providing apparatus including second circuitry to,
acquire the error log from the providing-side device, the error log being previously transmitted via the communication channel, from the log transfer apparatus residing on the first network to the providing-side device residing on the second network, and
detect, in response to acquiring the error log, the information processing apparatus as being in a state in which the information processing apparatus is not able to communicate data with the function providing apparatus, the error log being generated by the information processing apparatus residing on the first network, and the error log being sent via the log transfer apparatus, residing on the first network, to the providing-side device residing on the second network.

2. The device management system of claim 1, further comprising:
the providing-side device, the providing-side device being a log management apparatus configured to manage the error log transmitted from the log transfer apparatus via the communication channel between the log management apparatus and the log transfer apparatus.

3. The device management system of claim 1, wherein the function providing apparatus functions as the providing-side device, and
the second circuitry is configured to acquire the error log transmitted through the communication channel between the log transfer apparatus and the function providing apparatus, functioning as the providing-side device.

4. The device management system of claim 1, wherein the second circuitry is further configured to, in response to detecting the information processing apparatus as being in the state in which the information processing apparatus is not able to communicate data with the function providing apparatus, output an instruction to take measures against the error depending on a content of the error log acquired, to notify the information processing apparatus of the instruction via the communication channel between the providing-side device and the log transfer apparatus.

5. The device management system of claim 1, wherein the first circuitry is further configured to verify the log transfer apparatus to establish a communication channel between the information processing apparatus and the log transfer apparatus, and
the first circuitry is further configured to transmit the error log to the log transfer apparatus through the communication channel between the information processing apparatus and the log transfer apparatus.

6. The device management system of claim 1, wherein the first circuitry is further configured to encrypt the error log for transmission to the log transfer apparatus in a format decodable by the function providing apparatus.

7. The device management system of claim 6, wherein the first circuitry is further configured to sign the error log using a secrete key of the information processing apparatus, and encrypt the error log, once signed, using a public key of the function providing apparatus.

8. An information processing apparatus residing on a first network and configured to perform a function provided by a function providing apparatus residing on a second network, the information processing apparatus comprising:
circuitry to,
generate an error log, in response to detecting a status indicating an error in which the information processing apparatus is not able to communicate data with the function providing apparatus, the error log including information indicating a cause of the error indicated by the status detected, and
transmit the error log to a log transfer apparatus residing on the first network and configured to communicate data with a providing-side device residing on the second network through a communication channel established between the log transfer apparatus and the providing-side device, the error log, including information indicating a cause of the error indicated by the status detected, being subsequently obtainable by the function providing apparatus from the providing-side device, via the communication channel between the log transfer apparatus and the providing side device, the error log being generated and transmitted to the log transfer apparatus residing on the first network, and the providing-side device, residing on the second network, being configured to receive the error log.

9. The information processing apparatus of claim 8, wherein the circuitry is further configured to
receive, from the log transfer apparatus, restoration information indicating an instruction to change settings of the information processing apparatus, and
change the settings, based upon the instruction to change the settings, to enable the information processing apparatus to access the function providing apparatus via a network connection.

10. An information processing method performed by an information processing apparatus residing on a first network and configured to perform a function provided by a function providing apparatus residing on a second network, the method comprising:
detecting an occurrence of an error in the information processing apparatus;
determining whether the error detected is a communication error;
transmitting to a log transfer apparatus residing on the first network, in response to the determining indicating that the error detected is the communication error, an instruction to build a communication channel between the information processing apparatus and the log transfer apparatus;
transmitting an error log indicating the error detected to the log transfer apparatus through the communication channel, built according to the instruction to build, between the information processing apparatus and the log transfer apparatus;
receiving, from the log transfer apparatus, restoration information indicating an instruction to change settings of the information processing apparatus; and
changing the settings, based upon the instruction to change the settings, to enable the information processing apparatus to access the function providing apparatus via a network connection, the error log transmitted between the information processing apparatus and the log transfer apparatus residing on the first network, and the function providing apparatus residing on the second network.

11. The device management system of claim 1, wherein the second circuitry, of the function providing apparatus, is further configured to,
receive, from the log transfer apparatus, restoration information indicating an instruction to change settings of the information processing apparatus; and
changing the settings, based upon the instruction to change the settings, to enable the information processing apparatus to access the function providing apparatus via a network connection.

* * * * *